(12) United States Patent  
Oxley (10) Patent No.: US 7,898,477 B1
(45) Date of Patent: Mar. 1, 2011

(54) VOLUMETRIC DIRECTION-FINDING USING A MAXWELL FISH-EYE LENS

(76) Inventor: Roger Dale Oxley, Darnestown, MD (US)

( * ) Notice: Subject to any disclaimer, the term of this patent is extended or adjusted under 35 U.S.C. 154(b) by 0 days.

(21) Appl. No.: 12/697,262

(22) Filed: Jan. 31, 2010

(51) Int. Cl.
*H01Q 3/22* (2006.01)
*G01S 5/04* (2006.01)

(52) U.S. Cl. .......................... 342/375; 342/447
(58) Field of Classification Search .......... 342/375, 342/447
See application file for complete search history.

(56) References Cited

U.S. PATENT DOCUMENTS

| | | | | |
|---|---|---|---|---|
| 4,314,249 A * | 2/1982 | Onoe | ............... | 342/6 |
| 4,857,937 A * | 8/1989 | Dadds | ............... | 342/377 |
| 5,047,776 A * | 9/1991 | Baller | ............... | 342/52 |
| 5,142,290 A * | 8/1992 | DuFort | ............... | 342/372 |
| 5,424,737 A * | 6/1995 | Lindell | ............... | 342/5 |
| 6,426,814 B1 * | 7/2002 | Berger et al. | ............... | 398/45 |
| 6,721,103 B1 * | 4/2004 | Strickland | ............... | 359/642 |
| 7,151,508 B2 * | 12/2006 | Schaffner et al. | ............... | 343/911 L |
| 2003/0043086 A1 * | 3/2003 | Schaffner et al. | ............... | 343/909 |
| 2008/0108717 A1 * | 5/2008 | Tokoro et al. | ............... | 521/56 |

\* cited by examiner

*Primary Examiner* — Thomas H Tarcza
*Assistant Examiner* — Harry Liu

(57) ABSTRACT

Disclosed is an Radio Frequency (RF) volumetric direction finding (DF) methodology, utilizing an Half Maxwell Fish-eye (HMFE) Lens having a semi-spherical shape, a focal plane with a feed structure composed of near-equally spaced frequency-independent antenna elements disposed uniformly to form a 2-dimentional feed array; and RF power splitters for each element and combiners for combining the RF energy received by the elements; forming rows and columns; thereby reducing the number of required RF receiver channels for subsequent processing, where the maximum row/column and differential amplitude comparison is used for deriving DF estimation of intercepted signals; as part of a robust signal detection and direction-finding (DF) system; for detecting and processing a plurality of signals emanating from navigation, radar and communication equipment on surface and airborne platforms.

10 Claims, 9 Drawing Sheets

(a) Angular Feed Displacement (b) Rectilinear Feed Displacement

Half Maxwell Fish-Eye Lens with Focal Plane Array

Figure 1: Half Maxwell Fish-Eye Lens with Focal Plane Array

Figure 2: Feed Structure Array Composed of Angular or Rectilinear Disposed Elements Figure 3: Lens Focal Point Pattern Figure 4a: Row/Column Feed Array Layout Figure 4b: Row/Column Summing

|   | Column | | | | | | |
|---|---|---|---|---|---|---|---|
|   | 1 | 2 | 3 | 4 | 5 | 6 | 7 |
| Row 1 |   |   | 34 | 4 | 11 |   |   |
| 2 |   | 27 | 33 | 3 | 10 | 16 |   |
| 3 | 22 | 26 | 32 | 2 | 9 | 15 | 19 |
| 4 | 21 | 25 | 31 | 1 | 8 | 14 | 18 |
| 5 | 20 | 24 | 30 | 37 | 7 | 13 | 17 |
| 6 |   | 23 | 29 | 36 | 6 | 12 |   |
| 7 |   |   | 28 | 35 | 5 |   |   |

Figure 5: Row/Column Decoding of DF

Figure 6: Notional System Design

Figure 7: Feed Element Differential Amplitude for Signal Direction Estimation

| Frequency in GHZ | Lambda" | Lambda/2" | Lambda^2" | Gain(dB) | Lens BW° | (d) Lambda Element Spacing | Rec Focal Spot Airy Pattern BW° | Net Gain | RMS DF Accuracy |
|---|---|---|---|---|---|---|---|---|---|
| 8 | 1.48 | 0.74 | 2.18 | 20.54 | 19.10 | 0.55 | 20.99 | 14.93 | 1.69 |
| 9 | 1.31 | 0.66 | 1.72 | 21.56 | 16.97 | 0.62 | 18.66 | 15.55 | 1.43 |
| 10 | 1.18 | 0.59 | 1.39 | 22.47 | 15.28 | 0.69 | 16.79 | 16.04 | 1.23 |
| 11 | 1.07 | 0.54 | 1.15 | 23.30 | 13.89 | 0.76 | 15.27 | 16.44 | 1.07 |
| 12 | 0.98 | 0.49 | 0.97 | 24.06 | 12.73 | 0.82 | 13.99 | 16.75 | 0.93 |
| 13 | 0.91 | 0.45 | 0.83 | 24.75 | 11.75 | 0.89 | 12.92 | 16.98 | 0.82 |
| 14 | 0.84 | 0.42 | 0.71 | 25.40 | 10.91 | 0.96 | 11.99 | 17.15 | 0.72 |
| 15 | 0.79 | 0.39 | 0.62 | 26.00 | 10.18 | 1.03 | 11.19 | 17.26 | 0.64 |
| 16 | 0.74 | 0.37 | 0.54 | 26.56 | 9.55 | 1.10 | 10.50 | 17.31 | 0.56 |
| 17 | 0.69 | 0.35 | 0.48 | 27.08 | 8.99 | 1.17 | 9.88 | 17.31 | 0.50 |
| 18 | 0.66 | 0.33 | 0.43 | 27.58 | 8.49 | 1.24 | 9.33 | 17.27 | 0.44 |

Figure 8: Notional System Performance

VOLUMETRIC DIRECTION-FINDING USING A MAXWELL FISH-EYE LENS

BACKGROUND OF THE INVENTION

1. Technical Field

The RF spectrum is increasingly dense and complex, with expanding introduction of commercial, civil and military emissions, which places extreme demands on the reconnaissance, surveillance and early-warning equipment and missions. The modern weapons and delivery systems have also evolved to be increasingly silent and stealthy, with supersonic/hypersonic delivery speeds, placing naval platforms at high risk. As a result, the need for simultaneous wide-instantaneous-bandwidth, high sensitivity and precision direction-finding is paramount to military success.

Similarly, reconnaissance and surveillance activities need instantaneous-bandwidth, high sensitivity and precision direction finding to overcome scan-on-scan-on-scan (antenna on antenna on frequency) issues, for detecting and analyzing signals-of-interest in the modern crowded environments. This invention is a volumetric Radio Frequency (RF) receiving methodology, utilizing the Half Maxwell Fish-eye (HMFE) Lens for high-gain multi-beam contribution, a frequency independent feed structure to insure reception, element combined to form row and column, and processed to provide precision direction-finding of RF signals, emanating from navigation, radars and communication equipment on surface and airborne platforms. Such a system may be utilized for situation awareness, threat detection and warning, and may be used for cueing combat weapon and/or electronic attack systems. Further, such a system may be used on satellite, naval surface platforms, tactical aircraft and/or mobile/fixed land sites.

2. Prior Art

Modern signal detection and direction-finding techniques utilized multiple dispersed antenna/receiver channels to form vertical and horizontal baselines, per quadrant and use differential antenna/receiver phase, amplitude or time for estimating signal direction, or direction finding. As an example, to provide near hemispheric direction finding, the modern day system utilizes multiple-baseline multiple-quadrant linear interferometers, where each linear interferometer only provide a useful field-of-view of typically 90 degrees in either azimuth or elevation. Therefore, two linear-interferometer baselines are required per quadrant, one for azimuth and one for elevation, where each interferometer is composed of multiple phase-matched and/or calibrated element/receiver channels.

As the emitter approaches the collection system, the elevation angle increases and can approach the apex, where all DF information is severely compromised if not lost (commonly referred to as the donut pattern, caused by shortening of the electrical-length of the antenna baseline as a function of COS $(\theta_{el})$ where $\theta_{el}$ is the elevation angle. Further, interferometry requires use of wide field-of-view antenna elements, sufficiently wide for instantaneous quadrant field-of-view, which severely limits antenna gain, which directly impacts system sensitivity and direction finding accuracy; and provides virtually no spatial filtering for signal discrimination and interference mitigation.

The typical two dimensional interferometer system can be composed of 5 antenna/receivers for azimuth, another 5 antenna/receivers for elevation, times 4 quadrants, which can add up to 40 or more antenna/receivers, with each channel requiring complex detection and measurement processing. For these reasons a near hemispheric direction-finding system can be very large, expensive, require substantial complex processing and plagued with maintenance/calibration issues. This disclosure will provide the requisite performance while substantially reducing the required RF channels, size and cost as compared with these prior art systems.

Some available publications describing the prior art includes:

(1) R. L. Goodwin, "Ambiguity-Resistant Three- and Four-Channel Interferometer," Naval Research Laboratory Report, September 1976. pp all.
(2) Roger D. Oxley, "Ambiguity-High-Resolution, Six-Channel Interferometer Development and Performance," Naval Research Laboratory Report, September 1976. pp all.
(3) James Bao-Yen Tsui, "Microwave Receivers With Electronic Warfare Applications," Krieger Publishing Company, Malabar, Fla. pp 1-4, 93-111.

BRIEF SUMMARY OF THE INVENTION

Substance

This invention utilizes a single multi-beam antenna aperture that offers instantaneous wide RF bandwidth, volume coverage, and beam-forming for high gain—high sensitivity, for signal detection and precision direction-finding (DF). This antenna system incorporates a semi-spherical lens, with the lens focal-plane covered by near-uniformly spaced elements to form an array of frequency-independent (broadband) receiving elements as the antenna feed. Thus, plane-waves emanating from any direction within the field-of-view volume will focus on one or more elements within the focal plane array. By processing the signal amplitude information imparted by the illuminated elements permit estimating the arriving 2-dimentional directionality with high precision.

The focal plane array is composed of near-uniformly spaced frequency-independent elements, distributed rectilinear or angular to form a 2-dimentional array feed design, where each element is split and combined to form near orthogonal rows and columns, plus a single all-summed (all elements) output to provide an Omni directional broadband capability for high-probability of intercept. Forming rows/columns drastically reduces the number of required RF channels while preserve the directional information for estimating precision DF.

In summary, simultaneous multiple-beam high reception antenna-gain is provided by the lens over the entire hemispheric field-of-view volume, all-summed channel functions as Omni directional for providing 100% probability of intercept (at the expense of reduced gain), and columns/rows dramatically reduce the required number of RF channels, which reduces cost, size and complexity.

To put this in prospective, using row/column detection; sensitivity as compared with prior art can be increased by a 100 fold; volume coverage and wide frequency bandwidth can provide 100% probability of intercept, which is rarely affordable with prior art; fractional-degree direction finding accuracy can easily match or exceed prior art, and the required RF paths, as compared with prior art can be substantially reduced from typically 40 or more by a factor of approximately three.

This invention may be used in a wide variety of applications, including commercial, civil and military, to provide high sensitivity, high probability of intercept, precision DF measurement for situation awareness and threat warning.

OBJECT OF THE INVENTION

There is a need for a system which can provide near hemispheric volume coverage with antenna gain, spatial filtering and precision signal direction-finding measurement. The primary objective of the invention is developing a means for performing radio frequency (RF) precision direction finding (DF) of multiple simultaneous signals dispersed over a near hemispheric spatial volume and extended frequency bandwidth. Furthermore, the goal is to overcome the prior-art limitations of requiring large numbers of antenna elements dispersed over multiple linear baselines, RF channels and/or quadrants to achieve comparable coverage.

Most operational platforms, particularly naval and air platforms, have severely limited real estate for antenna subsystems. Therefore, the motivation to reduce the required size, complexity and weight for achieving hemispheric-volumetric signal interception is of growing importance. A compact single-aperture system would afford more flexibility and options for instillation, a potentially greater height on the ships mast to extend the horizon, and with reduced blockage/obstructions.

DETAILED DESCRIPTION OF THE INVENTION

The RF spectrum of today is increasingly dense with the rapid introduction of commercial, civil and military emissions, which has placed extreme demands on military situation awareness and early-warning equipment and missions. The modern weapon and delivery systems have evolved to be silent and stealthy, and weapons are able to cruise at supersonic/hypersonic speeds. Many of these threats employ low-probability-of-intercept (LPI) technology to further evade detection. Similarly, reconnaissance and surveillance activities are hampered, lacking bandwidth, high sensitivity systems with direction finding; to address complex scan-on-scan issues. Detecting and analyzing signals of special interest is increasingly difficult.

Addressing these operation issues require system architectures which can instantaneously look in all hemispheric directions while monitoring the full frequency coverage (typically several GHz), have antenna gain for sensitivity, and precision signal direction-finding measurement accuracy. For those skilled in this technology sector, will readily recognize this as somewhat contradictory requirements and extremely challenging to accomplish. Antenna gain/high sensitivity implies narrow antenna beam-width, or otherwise high processing gain. Certainly it's possible to configure a host of narrow-beam antennas dispersed spherically and provide requisite volumetric gain, but the number of antennas and receivers become extremely large in number.

This invention can address all of these operational issues, by providing instantaneous hemispheric coverage for broad frequency bandwidths, using a multi-beam lens where signal energy is focused (to provide high gain) on a frequency-independent focal array feed-structure; where the feed elements are split and combined in a novel manner that significantly minimizes the number of required RF channels and subsequent receivers, as compared with the number of elements used. Channel and row summing forms narrow fan-beams covering the entire field-of-view in one axis, with an acceptable overall antenna gain penalty. Further, row/column summing retains traceability back to the original focal point elements; and by exploiting the differential-amplitude information for adjacent row/column, precision direction finding is achieved. With this implementation, the required number of RF channels and subsequently required receivers are typically reduced by a factor of 3, as compared with the total number of elements.

The (HMFE) Lens has been extensively studied internationally and used for specialized microwave and millimeter applications for communications, commercial broadcast and satellite tracking. Other recent areas of interest (as indicated in open literature) include collision avoidance and other millimeter wave applications.

As an example, satellite tracking is accomplished by providing a reflective surface on the flat side of the HMFE lens, where the semi-spherical portion of the lens is oriented vertically, exposed to the satellite RF emission. An electro mechanical arm supports a receiving element, which is first scanned over a portion of the lens for acquiring the satellite signal and accurately positioned to maintain tracking of the satellite signal (mostly geo-stationary). Other applications typically use patch antenna elements as a feed structure, for signal detection. In these applications, the actual signal direction is inconsequential with no necessity to measure the direction. These applications using the multi patch-element feed are narrow-band and primarily limited to communication.

Figure 1:
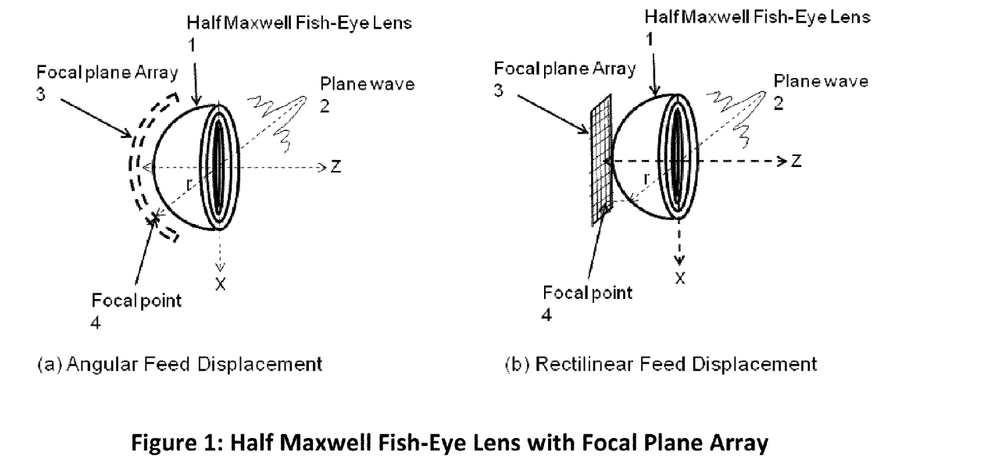
FIGS. 1(a) and 1(b) shows the Half Maxwell Fish-Eye lens, where beam forming produced by the gradient diffractive interior layers, shown as concentric rings 1, 2 at the face of the lens (flat surface); plus the multi-element feed-structure either partially surrounds (a) 3 the lower half of the Lens for an Angular Feed Displacement array, or utilizes a Rectilinear Feed Displacement array (b) 3.

For this invention, a multifold solution is disclosed to address deficiencies of current art direction-finding systems. First, a relatively simple antenna and feed assembly, using the HMFE Lens is disclosed. The lens shown in FIG. 1 is composed of a non-homogenous medium with a dielectric gradient index, whose relative permittivity varies radial (center to outer radial edge) given by:

$$n(r)=2/(1+r^2)$$

Where n(r) is the index of refraction of the spherical RF lens at a radial distance r from its center. A smooth variation of index of refraction from the radius is very difficult to achieve, but a step-wise shell construction has proven to be very successful by several vendors. Rosedal Associates, located in Santa Calif. produces a product line of lens antennas with a variety of sized and characteristics. Another vendor offering a product line of lens antenna is Lun'tech located in France. The operation of the lens 1 is best understood by tracing the RF ray path as the lens receives RF energy from an incoming plane wave 2 and migrates through the core of the lens. The index of refraction is graded in such a way as to cause the impinging ray to bend and focus 4 at a finite location on the semi-spherical side of the lens.

Figure 2:
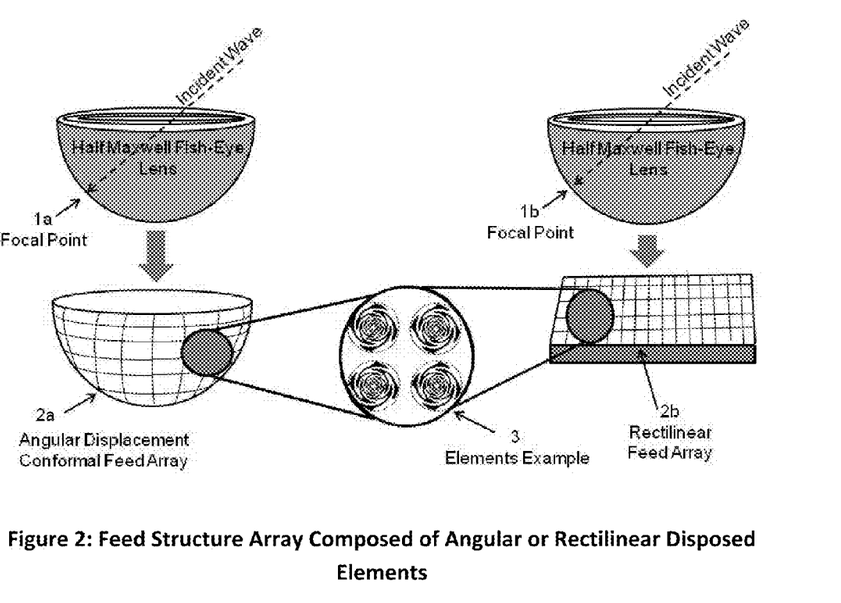
FIG. 2 shows an incident RF plane wave impinging on the Half Maxwell Fish-Eye lens, and beam focused either on the Angular Displacement feed structure 1a, or the Rectilinear Disposed 2b near equally-spaced frequency-independent elements such as the Sinuous or Vivaldi.

The lens with either the rectilinear or angular conformal Array Feed structure is shown in FIG. 2 incorporating an feed array 2a and 2b of frequency-independent elements 3, approximately uniformly displaced to form an array of elements located at the lens focal plane. For surface platform applications, the lens and array feed structure may be constructed to provide near hemispheric coverage, or may utilize fewer elements and provide quadrant coverage. Plane-waves arriving at the lens are focus 1a and 1b to illuminate one or more elements on the focal plane feed structure.

The feed element spacing is matched to the lens focal-point spot-size for the systems highest operating frequency, such that when the lens focal-point spot is exactly centered on a single elements, the power level at the closest neighboring element is approximately 6 to 10 dB down from the focal-point spot power. Of course numerous other spacing to power relationships can be chosen based on application objectives. The choice of 6 to 10 dB is partially for illustration purposes, but also based on previous experience, which favors using this value to accommodate widening spot-size for lower frequencies, constraining antenna-gain loss, and when the focal-point spot is centered exactly between two elements, the received power level of both elements are on-the-order of 3 dB down from the spot power level.

This geometry will assure that a useful differential amplitude condition between adjacent feed elements, while providing acceptable antenna gain and support fine direction-finding measurement, which will be further developed and described later. Mutual coupling between feed elements can be a limiting factor particularly if chosen spacing is less than $\lambda/2$. Also, constructing the feed array using planar antenna elements such as the Spirals, Sinuous exhibit broad bi-directional beams (toward the lens and reverse direction) needing a layer of RF absorber material applied to the reverse side of the feed-structure. Also, it should be pointed out that the feed element should be extremely broad beam (approximately 60 degrees of greater for maximum efficiency) as compared with the lens focus-point beam. Narrower beam width feed elements impose focal-beam side-lobe amplitude taper, which lowers the lens side-lobe level at the expense of some lens efficiency.

To further define the feed element spacing, we must define the lens focal-point spot-width, which will influence the selected feed-element spacing. Diffraction theory defines the minimum focal-point spot-radius ($r_A$) for the lens aperture of diameter D is equal to:

$$r_A=1.22(f\lambda/D)$$

where D is the diameter of the lens; f is the focal length of the lens (from the center of the of the sphere to the focal point), and $r_A$ is the first null location; and $\lambda$ is the free space wavelength for the design frequency (highest frequency of operation). Therefore, the width (first null to null) of the focal-point spot-width is simply $r_A$ times 2 and the spot-width expressed in degrees is: 180 (2 $r_A/(\pi D/2)$).

Figure 3:
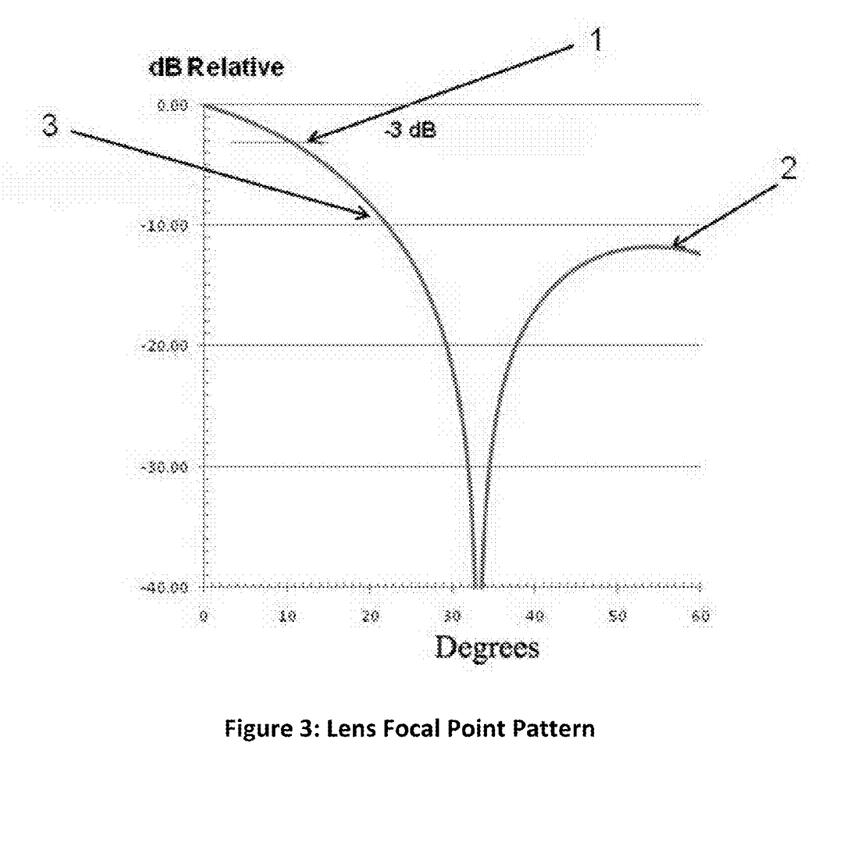
FIG. 3 depicts the Half Maxwell Fish-Eye lens focus point 1 beam-shape pattern versus radial angle 3 relative to the center of the Half Maxwell Fish-Eye lens, and side-lobe level 2 for a given frequency and lens radius.

An example antenna is comprised of a 112 mm (4.4") diameter lens, with the design frequency of 18.0 GHz, provides 25.6 dB gain, with a half-power (−3 dB) beam-width (HPBW$_{-3}$) of 10.7 degrees. FIG. 3 shows the calculated focal-point spot beam-pattern 1 (or the Airy pattern, FIG. 3 shows the pattern for a 3.5" diameter lens); where the focal-point spot is shown exactly centered on a single element (centered at 0 degrees) with the adjacent element to be located at approximately the −10 dB point 2 on the focal-point beam pattern. Solving the focal-point radial spot-width (null to null) in inches is given by:

$$r_A=1.22(f\lambda/D)$$

where f is focal length of 4.4/2 and $\lambda$ is 39.37(299.792/18000) for 18 GHz design frequency and D of 4.4, gives radius $r_A$ equal to 0.4 inches. Also, expressed in degrees is 180(2 $r_A/(\pi D/2)$) which gives ($\theta_2 r_A$)=20.84 degrees. Again, this represents null to null, and the Airy pattern is known to approximate the Bessel function, where the −3 db and the −10 db point to the first null is approximately a ratio 0.42 and 0.7 respectively. Therefore, the −10 db point, would equate to a spot beam-width of approximately 14.5 degrees.

Figure 4A:
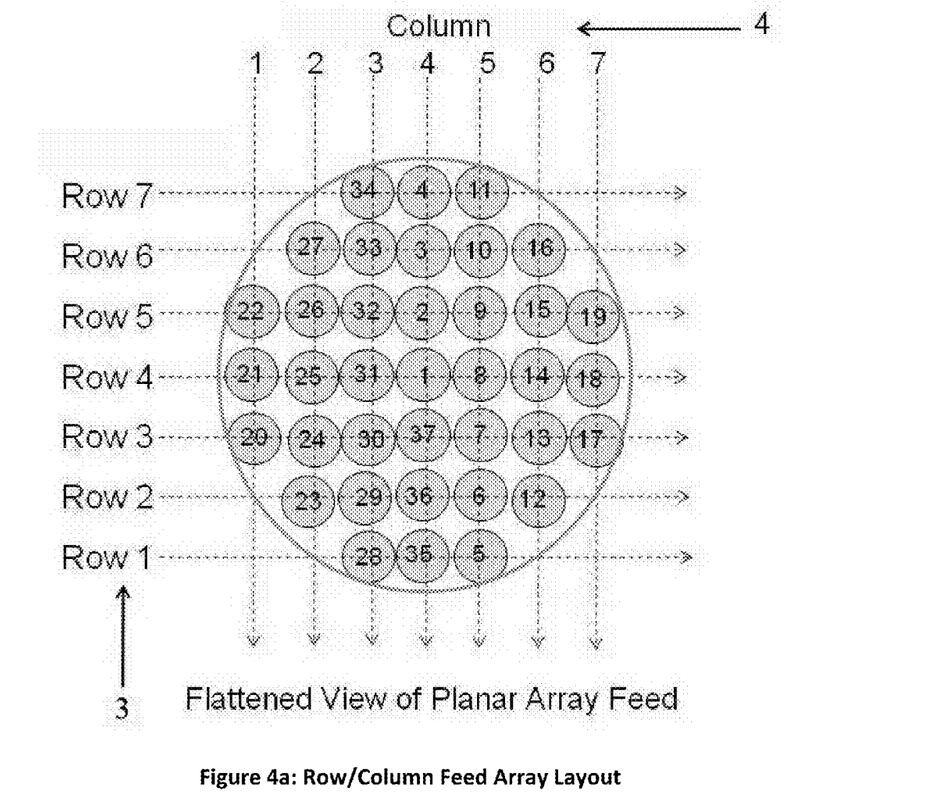
FIG. 4a is a flattened view of a notional semi-spherical conformal array feed composed of 37 elements, showing element spacing and numbering, organized in rows 3 and columns 4.

The number of required equally spaced elements to cover a half-spherical area, configured in rows and columns, can be estimated by:

$$N=|2\pi(D^2/4)/\pi r^2_A|$$

which equals approximately 30 for this example design. This formula works reasonably well for large population of elements, where the number of elements overlaying the spherical edge is a small percentage of the total. For illustration the flattened view of the semi-spherical feed structure is shown in FIG. 4a which contains 37 elements as opposed to the calculated 30.

Figure 4B:
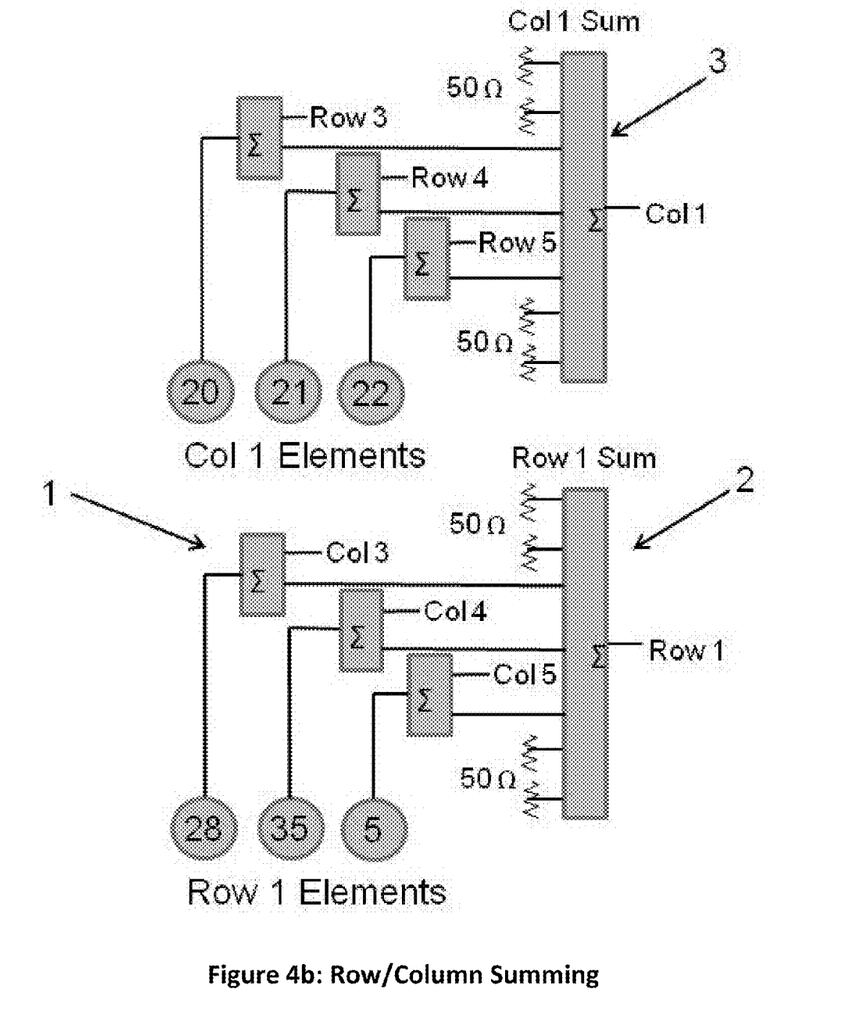
FIG. 4b shows the notional design RF splitting of each element 1, followed by summing to create columns 3, rows 2.
Figure 5:
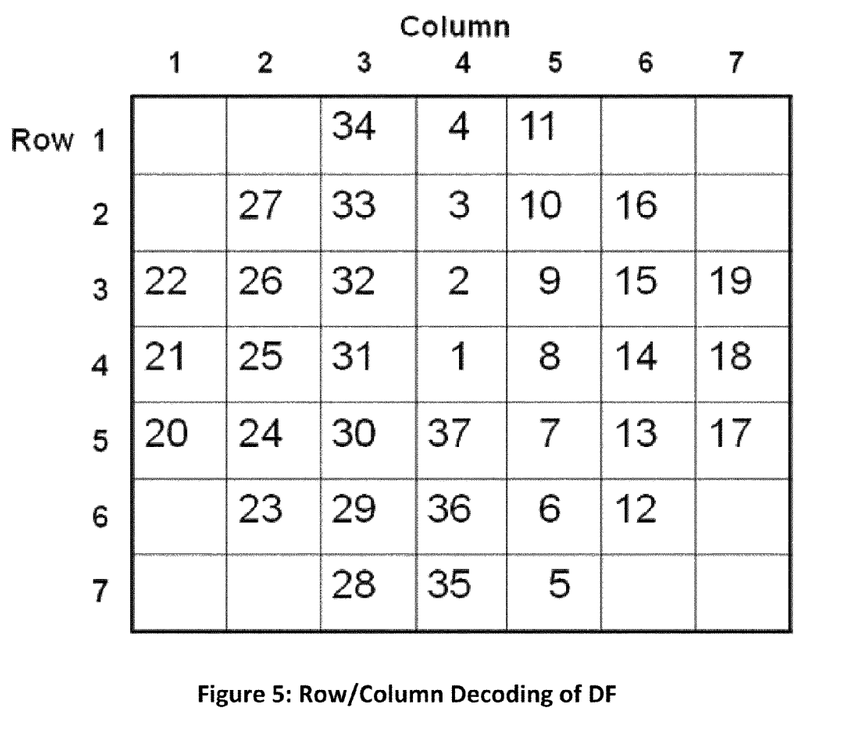
FIG. 5 shows the notional 7×7 arrangement of columns and rows showing the corresponding feed elements numbered in the table, which later forms the basis for recovering the original illuminated elements.

The feed elements shown in FIG. 4a is organized for creating columns 4 and rows 3. This is further described with FIG. 4b where each element is power divided 1 creating two paths for each element. The first path is 2 is summed to create Rows and the second path is summed 3 to create Columns. For this example, split and summing provides 7 Rows, 7 Columns for a beam broadening loss (fan-beam) of approximately 8.5 db, reducing the lens gain to approximately 16 db. Through split/summing the 37 discrete elements are reduced to 15 channels. FIG. 5 shows the row/column segmentations, where the intersection of any Row and Column identifies the elements illuminated by the lens.

Figure 6:
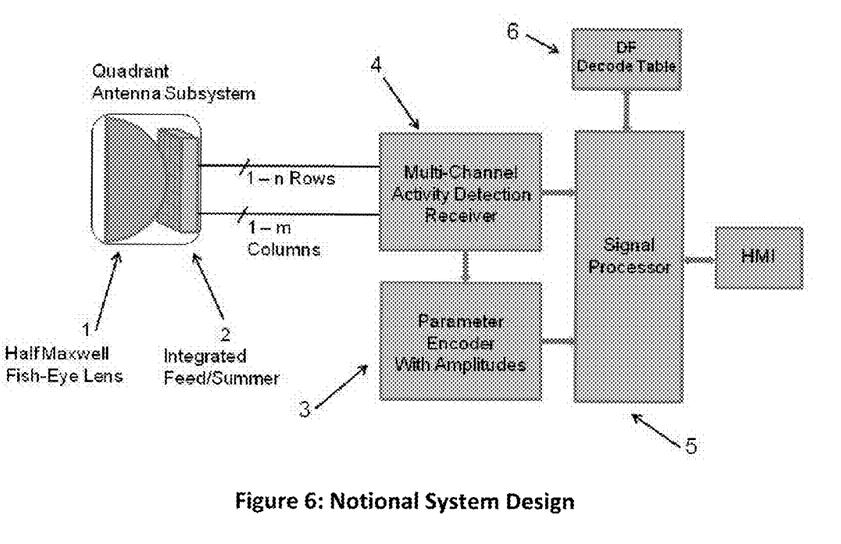
FIG. 6 is a notional block diagram of a system using the Half Maxwell Fish-Eye lens 1, integrated feed/summing 2, column and row channels for activity detection 4, parameter measurement and max amplitude determination 3, followed by signal processing 5 and direction or arrival determination 6.

With the Antenna subsystem described, the second solution is further disclosed. As shown in FIG. 6, the Row/Column outputs 2 are passed from the antenna subsystem and interfaced over coax, waveguide or RF over fiber or other interface media to the Multi-Channel Activity Detection Receiver (MCADR) subsystem, potentially located in an enclosed space or below-deck in the case of a naval vessel or other platforms, for final processing. The MCADR has a matching number of parallel channels for simultaneously processing all column/rows for signal activity. Upon amplitude threshold crossing of any column/row pair, the MCADR and the Parameter Encoder (PE) derives the signal features and amplitudes for the primary column/row and their adjacent.

The MCADR activity receiver will typically be a broadband digital or analog channelizer, an Instantaneous Frequency Measurement (IFM), wideband logarithmic amplifier/detector or other suitable high-probability-of-intercept receiver.

Figure 7:
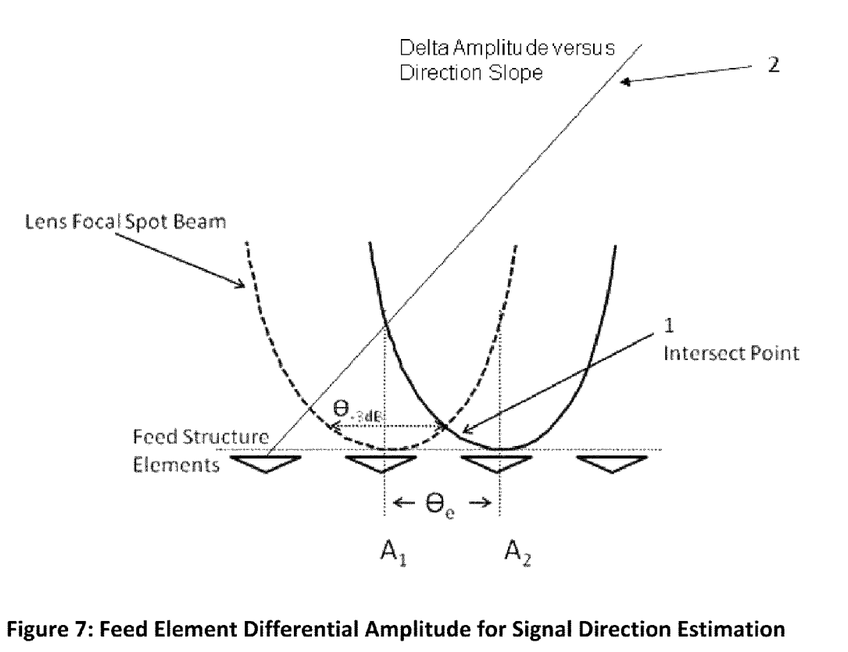
FIG. 7 depict the Half Maxwell Fish-Eye lens focal-spot beam pattern as it relates to an optimal feed element-spacing, showing the adjacent feed-element amplitude-difference 2 caused by the focal-spot beam pattern 1, later used for signal direction estimation.

The Signal Processor 5 receives the measurement data to include amplitude for each active row/column and their highest amplitude adjacent elements. The Signal Processor 6 utilizes the DF Decode Table to convert the maximum amplitude pair of column/row to course directional estimate. Using the Amplitude data as shown in FIG. 7 the highest adjacent pair in both row and column are subtracted to create differential-amplitude measurement, having a magnitude versus frequency slope, 2 appropriately scaled by frequency (correct for lens-focal point changes with operating frequency, etc.).

Both (row and column) differential amplitude measurements, and identified highest row and column are used by the Signal Processor to calculate the precision bearing for both azimuth and elevation. Again, the highest identified row and column provide the first-order bearing measurement and the corresponding differential amplitude measurements are then applied for fine correction.

The described first-order bearing and fine correction process, using the identified highest row/column and differential amplitude data, can be potentially processed through a variety of means other than that described by direct table lookup; i.e. algorithmic conversion and use of kinematic tracker algorithms, etc. to further improve tracking accuracy for signals traversing the volume. It is pointed out that the row/column fan-beams have considerable gain which maintain high signal-to-noise (SNR) for improved directional estimation accuracy.

Numerous other variations can be adapted for this invention, such as further summing of either column or rows will provide an all sum, an equivalent of an Omni with little to no gain, but high probability of intercept detection with a single channel. When Omni activity detection is acceptable, the all sum and a single Broadband Activity Receiver can rapidly measure frequency to initiate a Fast-Call operation utilizing narrow-band fast tuning RF receivers, for subsequent processing of column/row channels. This is often referred to as a fast-call mono-pulse receiver architecture, which typically utilizes a delay line to delay the channel/row RF allowing time for the fast-call receiver to tune to the same detected pulse for column/row processing.

Another option is to use tune step-and-dwell of row/column narrow band receivers, time-sharing a limited number of receivers, and avoid the need for RF delay and wideband activity receivers. Further, each row and column 1 to N could have an incremental increase in RF Delays, where the incremental value exceeds the required time-time of the Multi-Channel fast-call receivers. Such an implementation would allow am N-position switch to cycle through the incremental RF delay and process all rows/columns with a single narrow band fast-call receiver.

Figure 8:
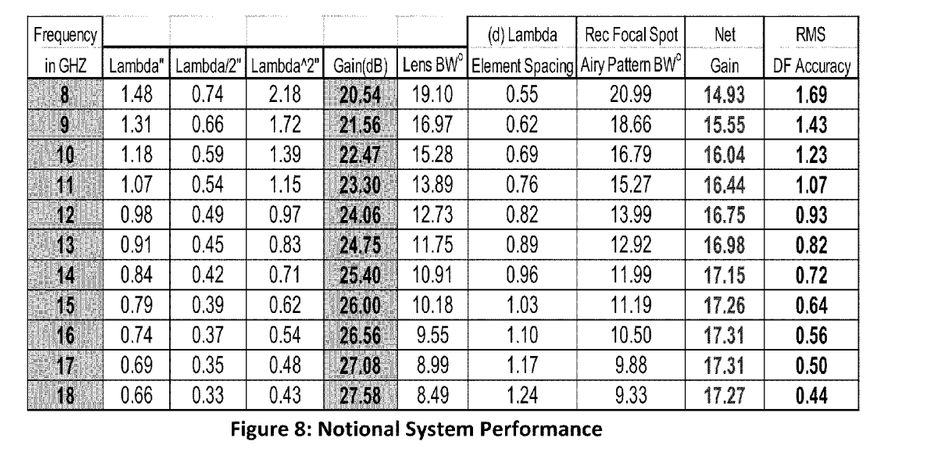
FIG. 8 is a table containing directional (DF) performance accuracy versus frequency, derived from modeling the notional system design, based on the 7 by 7 (rows/columns) system design.

The notional design described in this disclosure was modeled as an 7×7 row/column receiver system, utilizing the 4.4 inch HMFE Lens, with the Sinuous semi-spherical feed structure. FIG. 8 shows the summary performance covering 8 to 18 GHz with directional accuracies ranging from 1.7 to 0.44 degrees rms. Though not specifically stated elsewhere, the sinuous antenna elements used in the lens feed, can be dual polarization elements to support signal polarization measurement. This can be accomplished through switching between orthogonal polarizations or simultaneous processing of both polarizations without switching. Other elements that can be utilized include the horn or the Vivaldi.

Having described the invention in detail, the following claims are made:

1. An Broadband Volumetric Direction-Finding system comprised of a Half Maxwell Fish-Eye Lens having a semi-spherical shape and a rectilinear or angular feed structure array composed of near equally-spaced frequency-independent elements such as the Equiangular Spiral, Planar Spiral, Vivaldi, or Sinuous elements disposed along the focal plane of the Lens, to function as the array feed.

2. The system as claimed in claim 1 wherein the feed-array of near equally spaced frequency independent antenna elements are spaced such that the impinging signal plane-wave focused on an individual element, will also illuminate its adjacent elements with reduced RF power level such that the signal power level (amplitude) difference (differential amplitude) provides a means for estimating the signal's direction as it migrates from one element to the next in two dimensional space.

3. The system as claimed in claim 2 wherein the feed-array of near equally spaced frequency independent antenna elements are individually RF power-divided (split) and subsequently combined to create near orthogonal and plurality rows and columns; plus all elements are combining to create an all element sum outputs.

4. The system as claimed in claim 3 wherein the near orthogonal and plurality rows and columns are RF outputs contain encoded signal direction information; where the number of rows plus the number of columns are less than the number of total elements.

5. The system as claimed in claim 3 wherein the rows and columns are time-delayed through any means to allow time for RF receivers to detect the presence of signals using the rows, columns or all-sum RF output, and cue Fast-Tune receivers to process said signals, propagating through the delayed rows and columns.

6. The system as claimed in claim 5 wherein each row and column is time-delayed through any means to allow sequential switching or processing through the rows and columns using fewer receivers than the total number of rows and columns.

7. The system as claimed in claim 3 wherein the processed rows and columns are used for detecting the presence of a signals and identifying their maximum adjacent pairs of intersecting rows and columns; based on RF power level (signal amplitude).

8. The system as claimed in claim 6 wherein the identified maximum intersecting adjacent pairs of rows and columns; based on RF power level (signal amplitude), are used in determining the feed elements and hence arriving direction of the signal.

9. The system as claimed in claim 7 wherein the identified maximum intersecting adjacent pairs of rows and columns; based on RF power level (signal amplitude), are used to form differential amplitude information for refining the signal direction measurement, and/or maintaining the signals directional measurement at it traverses element-to-element across the lens feed.

10. The system as claimed in claim 1 wherein the Broadband Volumetric Direction-Finding System comprising of a Half Maxwell Fish-Eye Lens and the frequency-independent array feed-structure, provides spatial filtering through beam forming, thereby mitigating multiple signal contention and/or destructive interference.

* * * * *